United States Patent [19]

Mishima et al.

[11] Patent Number: 4,579,711

[45] Date of Patent: Apr. 1, 1986

[54] FUEL ASSEMBLY SPACER

[75] Inventors: Yoshitsugu Mishima, Tokyo; Naoaki Takahashi, Hiratsuka; Kiyozumi Hayashi, Toride; Kazushige Domoto, Ibaraki, all of Japan

[73] Assignee: Doryokuro Kakunenryo Kaihatsu Jigyodan, Tokyo, Japan

[21] Appl. No.: 464,478

[22] Filed: Feb. 7, 1983

[30] Foreign Application Priority Data

Feb. 16, 1982 [JP] Japan .................................. 57-23143

[51] Int. Cl.⁴ ............................................... G21C 3/34
[52] U.S. Cl. .................................... 376/442; 376/438; 376/462; 376/900
[58] Field of Search ................. 376/442, 438, 462, 900

[56] References Cited

U.S. PATENT DOCUMENTS 3,994,779 11/1976 Brayman .............................. 376/442
4,312,705 1/1982 Steinke .................................. 376/442

Primary Examiner—Donald P. Walsh
Attorney, Agent, or Firm—Wenderoth, Lind & Ponack

[57] ABSTRACT

A spacer for supporting a plurality of fuel rods forming a nuclear fuel assembly. The spacer comprises a peripheral band surrounding a bundle of the fuel rods and a plurality of spacer framework units, each holding therein one fuel rod. The spacer framework units are welded or brazed to the peripheral band so as to be arranged inside the peripheral band. Spring members are integrally formed on each of the spacer framework units. The spacer framework units, the spring members and the peripheral band are made of a zirconium alloy containing 5-25% by weight niobium and 0.1-1% by weight chromium and/or iron.

5 Claims, 12 Drawing Figures

Zr-13.5Nb　　　　　　　　　Magnification: x50

Zr-13.5Nb-0.2Cr　　　　　　Magnification: x50

FUEL ASSEMBLY SPACER

BACKGROUND OF THE INVENTION

The present invention relates to a spacer for supporting a plurality of fuel rods forming a nuclear fuel assembly, and more particularly, it relates to an improvement in a spacer by using a specific zirconium alloy having a low neutron absorption cross-section and having good resiliency.

The spacer for supporting a large number of fuel rods forming the nuclear fuel assembly is means for retaining appropriate narrow gaps between adjacent fuel rods. Therefore, it is essential that the spacer prevent vibration in the radial direction of the fuel rods and bending in the lateral direction thereof during its retention of the fuel rods, and that no fretting corrosions are generated between the spacer and the fuel rods.

Various kinds of spacers have so far been proposed according to the different types of nuclear fuels and reactors. In a typical fuel assembly for boiling light water reactor (BWR) as shown in FIG. 1, for instance, a large number of fuel rods 1 are supported in such a manner that intermediate parts thereof are fixed by a plurality of spacers 2, while the upper and lower ends thereof are fixed by upper and lower fixing members 3 and 4 respectively. The spacers 2 are assembled by cross-linking a plurality of sheet divider members or grid sheets 7, so that they are formed into a grid constituting a plurality of spacer framework units within a peripheral band 6 surrounding a bundle of the fuel rods as shown in FIGS. 2A and 2B. The grid sheets 7 are embossed with bosses 8 as shown in FIG. 2B, while one corner of the spacer framework unit is fitted mechanically with a box-type four-sided leaf spring member 9 so as to support the fuel rod 1 elastically. Such spacer structure as described above is disclosed, for example, in U.S. Pat. No. 3,654,077. For the material of the spacers 2, zircaloy-4 is used for the peripheral band 6 and the grid sheets 7, while Inconel which has an excellent resiliency is used for the box-type four-sided leaf spring members 9, which are fitted mechanically to the grid sheets 7. This is because zircaloy-4 although having a low neutron absorption and an excellent corrosion resistance, has an inferior resiliency and, in addition, it cannot be welded to Inconel which has a superior resiliency. Accordingly, when the spacers are assembled, a complicated process is required to mechanically fit a number of box-type four-sided leaf spring members 9 to the grid sheets 7. Moreover, mechanical fitting makes it difficult to ensure the stability of the fitting and precision thereof, and further has the fault that a possibility of rupturing remains for the box-type four-sided leaf spring members while being employed in a reactor.

SUMMARY OF THE INVENTION

An object of the present invention is to eliminate the imperfections in the prior art described above, and to provide a fuel assembly spacer enabling an improvement in neutron economy, a simplification of the manufacture thereof, and a reduction of the manufacturing cost.

According to the present invention, there is provided a spacer for supporting a plurality of fuel rods forming a nuclear fuel assembly. The spacer comprises a peripheral band surrounding a bundle of the fuel rods and a plurality of spacer framework units, each holding therein one fuel rod. The spacer framework units are spot-welded or brazed to the peripheral band so that these spacer framework units are arranged inside the peripheral band. Each of the spacer framework units is provided with spring members embossed integrally thereon, so that the spacer framework unit holds one fuel rod therein with optimum pressing forces. The spacer framework units, the spring members and the peripheral band are made of a zirconium alloy containing 5–25% by weight niobium and 0.1–1% by weight chromium and/or iron.

The word "spring members" employed in the present invention means leaf spring members embossed directly onto the spacer framework units, each of which has spring bosses for pressing against the fuel rods and may also have fixing bosses for retainig the rods, as required.

PREFERRED EMBODIMENTS OF THE INVENTION

Figure 1:
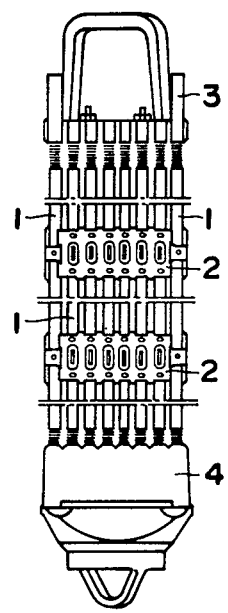
FIG. 1 is a longitudinal sectional view of a typical nuclear fuel assembly of a boiling light water reactor.
Figure 2A:
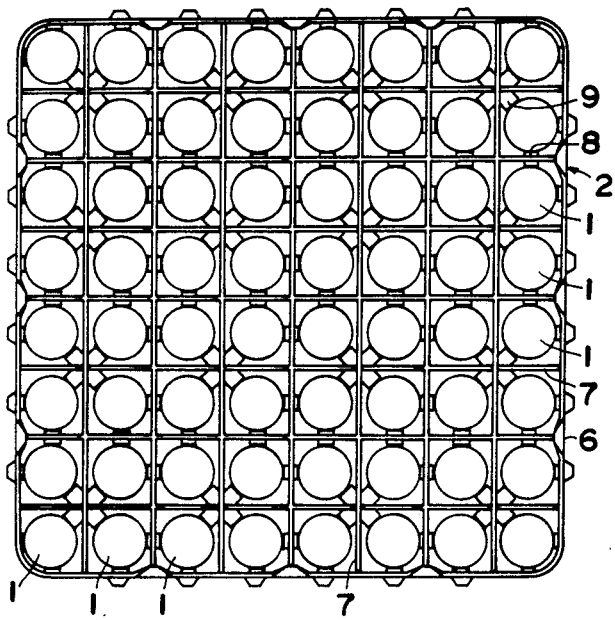
FIG. 2A is a plan view of a conventional spacer employed in the nuclear fuel assembly shown in FIG. 1.
Figure 2B:
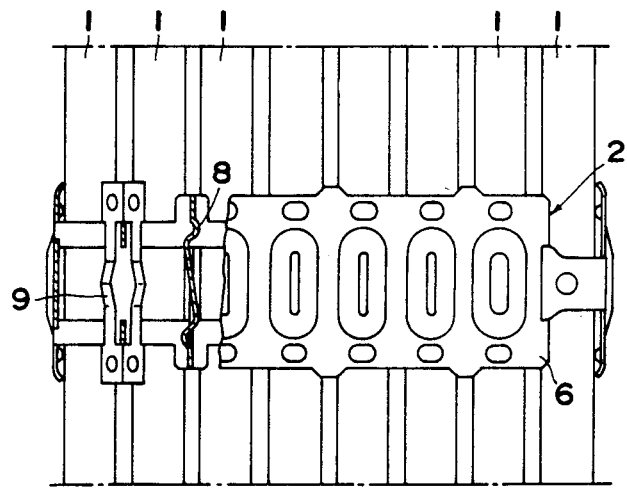
FIG. 2B is a front view of the conventional spacer shown in FIG. 2A.
Figure 3A:
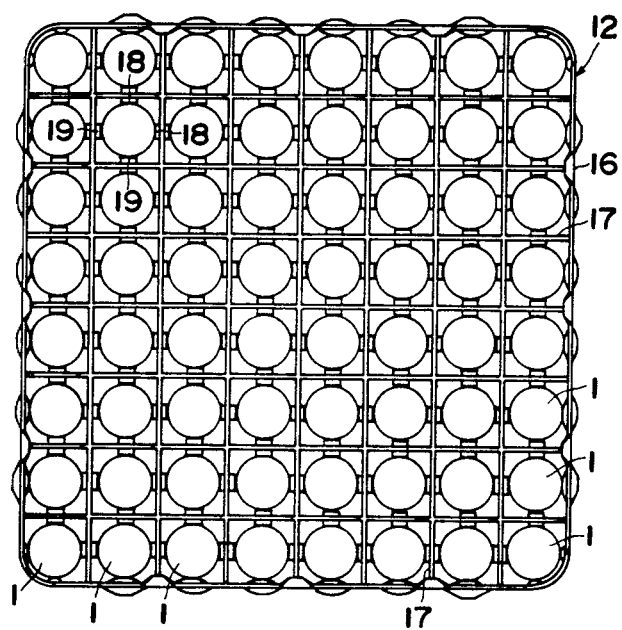
FIG. 3A is a plan view of one embodiment of a spacer according to the present invention.
Figure 3C:
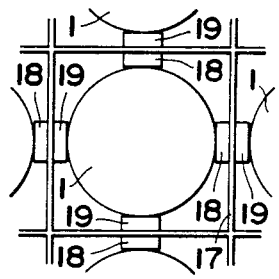
FIG. 3C is an enlarged plan view of the spacer shown in FIG. 3A.
Figure 3B:
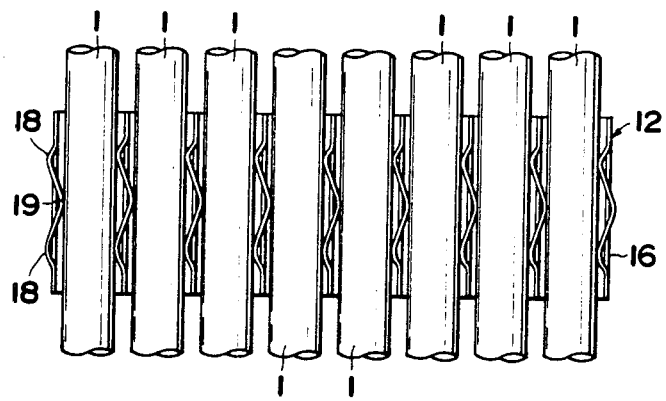
FIG. 3B is a front view of the spacer shown in FIG. 3A.

Referring to FIGS. 3A, 3B and 3C, there is illustrated a spacer of a nuclear fuel assembly for a boiling water reactor offered by the present invention. This spacer 12, like a conventional one, comprises a peripheral band 16 positioned around the outside of a bundle of fuel rods and a grid assembled within the peripheral band 16 by cross-linking sheet metal divider members or grid sheets 17. The grid sheets 17 are provided with spring members embossed integrally thereon. The spring members in the present embodiment comprises fixing bosses 18, with leaf spring bosses 19 projecting on the side opposite to the fixing bosses. In the present invention, these grid sheets 17 arranged crosswise and the peripheral band 16 are made of a specific zirconium alloy having good resiliency. This specific zirconium alloy contains 5–25% by weight niobium, 0.1–1% by weight chromium and/or iron, and remainder zirconium. These specifically-manufactured grid sheets 17 are assembled into a spacer by joining them to the peripheral band 16 by spot welding or brazing.

In this way, the spacer 12 is constructed only of a zirconium alloy having a low neutron absorption, and therefore it enables an improvement in the neutron economy. In addition, the provision of the leaf spring bosses 19 directly onto the grid sheets enables a simplification of the process of assembling the spacer and an elimination of parts liable to rupture when being employed in the reactor.

Figure 3D:
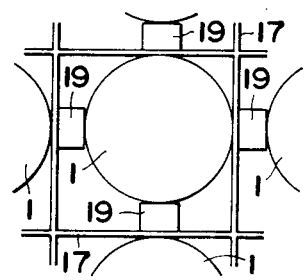
FIG. 3D is an enlarged plan view showing another embodiment of the present invention.

Another embodiment may be adopted, as shown in FIG. 3D. In this embodiment, only the leaf spring bosses 19 are formed as spring members on the grid sheets 17, with no fixing bosses being provided thereon, and thus the fuel rods are pressed against the flat surface of the grid sheets to retain them.

An explanation will now be made concerning the specific resilient zirconium alloy employed in the present invention. As mentioned above, this zirconium alloy is a multi-element alloy prepared by adding 5–25% by weight niobium to zirconium and further by having 0.1–1% by weight chromium and/or iron contained therein. This alloy can be employed with its excellent resilience characteristics at a temperature of about 300° C., its good corrosion resistance in high temperature water and its good weldability, by adjusting the final working ratios and heat treatment conditions. When a higher value of resilience limit is needed, heat treatment is conducted, for instance, under conditions in which the alloy is kept at 750° C. for 30 minutes in a vacuum furnace, then cooled to 640° C. in the furnace for 30 minutes, kept at this temperature for 15 minutes, and then cooled rapidly to 400° C. in the furnace, then aging treatment is conducted for one hour at this temperature, and thus an alloy having an resilience limit (Kb-value) of 145–150 kg/mm$^2$ can be obtained. When it is desired to increase the ductility of the alloy, an over-aging treatment is applied for 15 hours at a temperature of 500° C. after the above-described heat treatment. By the over-aging treatment, the elongation percentage becomes about 5% and thus a ductility about five times larger than the alloy produced without the over-aging treatment can be obtained, although the resistance limit (Kb-value) is reduced to about 100 kg/mm$^2$. Resilience limit (Kb-value) is listed in the following Table, obtained by various aging conditions of temperature and holding time. Based on these data, the optimum over-aging condition is decided as 500° C. temperature for 15 hours. Accordingly, it is sufficient to select such heat treatment conditions that enable the attainment of the desired high resiliency and ductility, by combining these temperature and time conditions as appropriate.

TABLE

| Resilience limit (Kb-value) and the aging conditions for Zr—13.5Nb—0.2Cr alloy | | | |
|---|---|---|---|
| Aging Temp. (°C.) | Aging Time (min.) | Rolling direction | Kb-value (Kg/mm$^2$) |
| 400 | 15 | T* | 157 |
|  |  |  | 142 |
|  |  | L** | 137 |
|  |  |  | 137 |
|  | 60 | T | 149 |
|  |  |  | 145 |
|  |  | L | 145 |
|  |  |  | 142 |
| 430 | 15 | T | 135 |
|  |  |  | 133 |
|  |  | L | 122 |
|  |  |  | 126 |
|  | 60 | T | 136 |
|  |  |  | 137 |
|  |  | L | 132 |
|  |  |  | 141 |
| 450 | 15 | T | 138 |
|  |  |  | 123 |
|  |  | L | 115 |
|  |  |  | 117 |
|  | 60 | T | 121 |
|  |  |  | 113 |
|  |  | L | 118 |
|  |  |  | 121 |
|  | 240 | L | 110 |
|  |  |  | 115 |
| 470 | 60 | L | 104 |
|  |  |  | 102 |

(Note)
*T: Traverse
**L: Longitudinal

The significance of the composition of the alloy and of the contents thereof is as follows. Niobium increases the tensile strength and raises the resilience limit of the alloy. It is necessary, however, to determine the quantity of niobium according to the required ductility, since an increase in the quantity thereof reduces the elongation and workability of the alloy. When the quantity of niobium added to the alloy is less than 5% by weight, it does not have a sufficient effect on the strength and the resilience limit, and when the quantity exceeds 25% by weight, both the resiliency and ductility are reduced unfavorably.

Chromium or iron is added to prevent the grain size of the alloy in the welded regions from growing, and therefore small quantities thereof will suffice. However, an increase in their quantities lowers the workability of the alloy, although the mechanical characteristics, resilience characteristic and corrosion resistance are increased slightly. The lower limit value of the addition quantity thereof is the minimum value of these materials to be added to prevent marked growth of the grain size after welding, and the addition can also improve the corrosion resistance. The upper limit value thereof is prescribed by the value shown above which it has an adverse effect on the ductility, and the addition of the materials exceeding this value is not appropriate from the viewpoint of the formability and punchability of the alloy. Thus the addition of small quantity of chromium or iron greatly improves the weldability of the alloy. When 0.2% by weight chromium is added, for instance, a marked effect can be perceived concerning the prevention of grain growth after spot welding.

Figure 4:
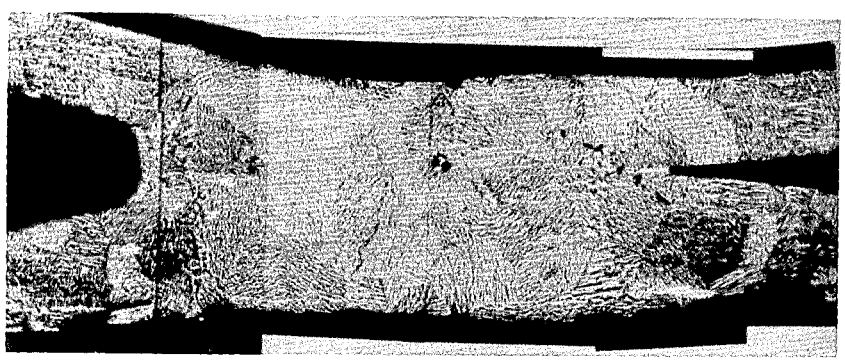
FIG. 4 is a metallographic photograph at a welded portion of Zr-13.5Nb alloy.
Figure 5:
FIG. 5 is a metallographic photograph at a welded portion of Zr-13.5Nb-0.2Cr alloy employed in the present invention.

FIGS. 4 and 5 are metallographic photographs which show the effect of adding the third element of chromium or iron to a Zr-13.5wt.% Nb alloy observed as decreasing the grain size at the welded portion of two spacer framework units of ring structure. Appearances of these photographs are different each other, because the thickness of the spacer framework units of ring structure and the etching procedure for preparing the metallographic specimen are a little different between them. It is apparent from these photographs that the grain size at the welded portion of Zr-13.5Nb-0.2Cr alloy (FIG. 5) is smaller than that of Zr-13.5Nb alloy (FIG. 4).

Figure 6:
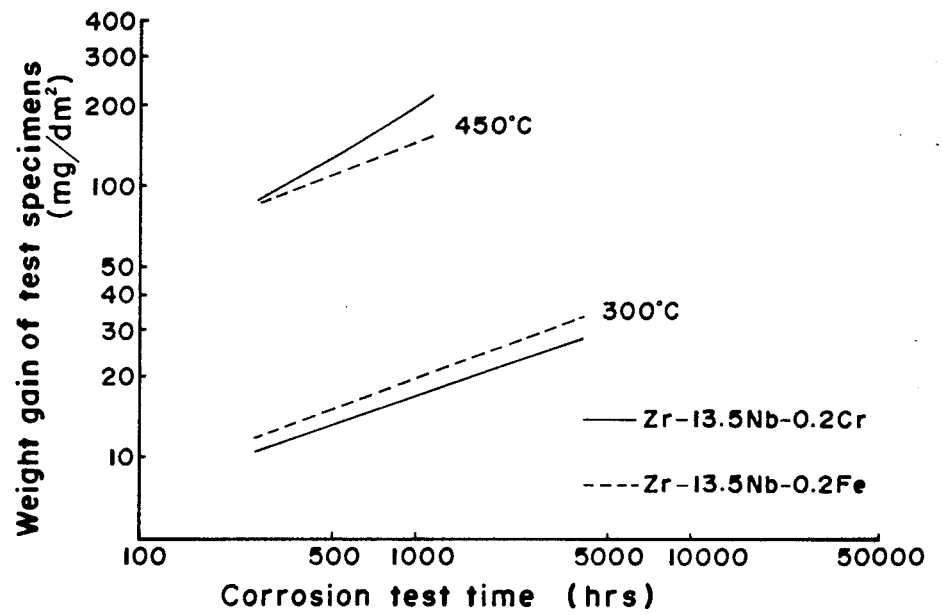
FIG. 6 is a graph showing examples of corrosion test data on an alloy employed in the present invention.

Regarding the corrosion resistance of the present alloy specimens, FIG. 6 shows data on the weight gain of the alloy which were obtained by a corrosion test conducted in water vapor at temperatures of 300° C. and 450° C.

For a Zr-13.5 wt.% Nb-0.2wt.% Cr alloy, the weight gain, when it was subjected to a corrosion test for 1200 hours in water vapor of 450° C., was 250 mg/dm$^2$, and no exfoliation (breakaway) of the oxide film occurred. The time is equivalent to 50,000-100,000 hours (more than twice the lifetim of the fuel assembly in the reactor) when the working temperature is converted to 300° C. A Zr-13.5wt.% Nb-0.2wt.% Fe alloy demonstrates almost the same characteristics as above-described.

From the viewpoint of thermal neutron economy, this alloy has a thermal neutron absorption cross-section of about 1/20 of the conventional Inconel, and thus the degree of burnup of the fuel rods is also increased.

This alloy has almost the same corrosion resistance, punchability and weldability as Inconel. In addition, the resilience characteristic of the present alloy is almost equal to that of Inconel, compared with the inferiority of zircaloy-2 or -4 in the resilience characteristic of Inconel. Accordingly, when the present alloy is employed for the material of the spacer according to the present invention, it can improve the neutron economy owing to its small neutron absorption cross-section, and this leads to a reduction of fuel costs.

Figure 7:
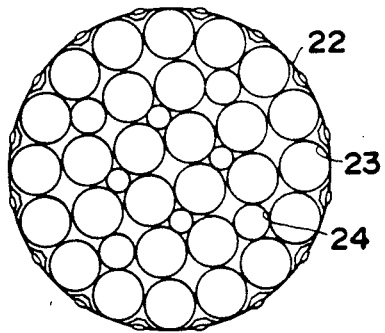
FIG. 7 is a plan view of a spacer of the present invention for a pressure tube type reactor.
Figure 8:
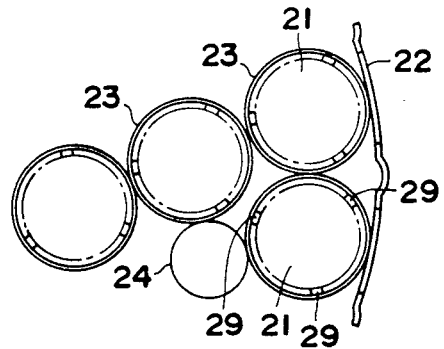
FIG. 8 is an enlarged plan view of the spacer shown in FIG. 7.

The foregoing is an embodiment of the present invention with reference, as an example, to a nuclear fuel assembly spacer which can be employed for the most common type of boiling water reactor, and this invention can also be applied for a spacer employed for a pressure tube type reactor. As shown in FIGS. 7 and 8, this kind of spacer has a structure wherein spacer framework units of ring structure 23 each holding one fuel rod 21 therein are arranged inside a circular peripheral band 22 surrounding the outside of a bundle of fuel rods. Numeral 24 indicates a reinforcing ring to keep the enough strength of the spacer. According to the present invention, these spacer framework units 23 and the circular peripheral band 22 are made of the specific zirconium alloy having good resiliency, and each of these spacer framework units of ring structure is provided on its periphery with at least three spring bosses 29 embossed integrally thereon. Compared with Inconel employed as the material for spacer framework units of ring structure and periphral band, the specific zirconium alloy employed in the present invention brings about the advantage that the neutron economy can be improved.

As described above, in the spacer of the present invention, the spring members are formed integrally on spacer framework units made of the specific zirconium alloy having good resiliency. Since the peripheral band is also made of the same zirconium alloy as that of the spacer framework units, the spacer can be constructed from only the zirconium alloy having a low neutron absorption by spot welding or brazing the spacer framework units and the peripheral band, and thus the neutron economy can be improved. In addition, since leaf spring bosses can be provided on the spacer framework units directly and integrally, the thus prepared spacer has the excellent advantage that the leaf spring bosses and the fixing bosses are provided accurately, that the process of assembling the spacer can be simplified, and that all parts are free from the danger of rupture when being employed in the reactor.

We claim:

1. In a spacer for supporting a plurality of fuel rods forming a nuclear fuel assembly, which spacer comprises a peripheral band surrounding a bundle of the fuel rods and a plurality of spacer framework units each holding therein one fuel rod, said spacer framework units being welded or brazed to said peripheral band so as to be arranged inside said peripheral band, the improvement wherein spring members are formed integrally on each of said spacer framework units, said spacer framework units, said spring members and said peripheral band are made of a zirconium alloy containing 5-25% by weight niobium and 0.1-1% by weight chromium and/or iron.

2. The spacer according to claim 1, wherein the spring members formed on said spacer framework unit consist of spring bosses for pressing against the fuel rods.

3. The spacer according to claim 1, wherein the spring members formed on sid spacer framework unit consist of spring bosses for pressing against the fuel rods and fixing bosses for retaining the fuel rods, said fixing bosses projecting on the opposite side of said spacer frameworks from said spring bosses.

4. The spacer according to claim 1, wherein said spacer framework units is assembled by cross-linking a plurality of grid sheets to form a grid structure within said peripheral band, said spring members being formed integrally on each of said grid sheets.

5. The spacer according to claim 1, wherein each of said spacer framework units has a ring structure and said peripheral band has a circular shape, said spacer framework units of ring structure being arrange inside said circular peripheral band, said spring members being formed integrally on each of said spacer framework units of ring structure.

* * * * *